No. 670,214. Patented Mar. 19, 1901.
M. TONKO.
POTATO PLANTING OR SETTING MACHINE.
(Application filed Oct. 18, 1900.)
(No Model.) 2 Sheets—Sheet 1.

Witnesses:
Wilhelm Vogt
Henry E. Evrding

Inventor:
Max Tonko,
by J. Walter Douglas
Attorney

THE NORRIS PETERS CO., PHOTO-LITHO., WASHINGTON, D. C.

No. 670,214. Patented Mar. 19, 1901.
M. TONKO.
POTATO PLANTING OR SETTING MACHINE.
(Application filed Oct. 18, 1900.)
(No Model.) 2 Sheets—Sheet 2.
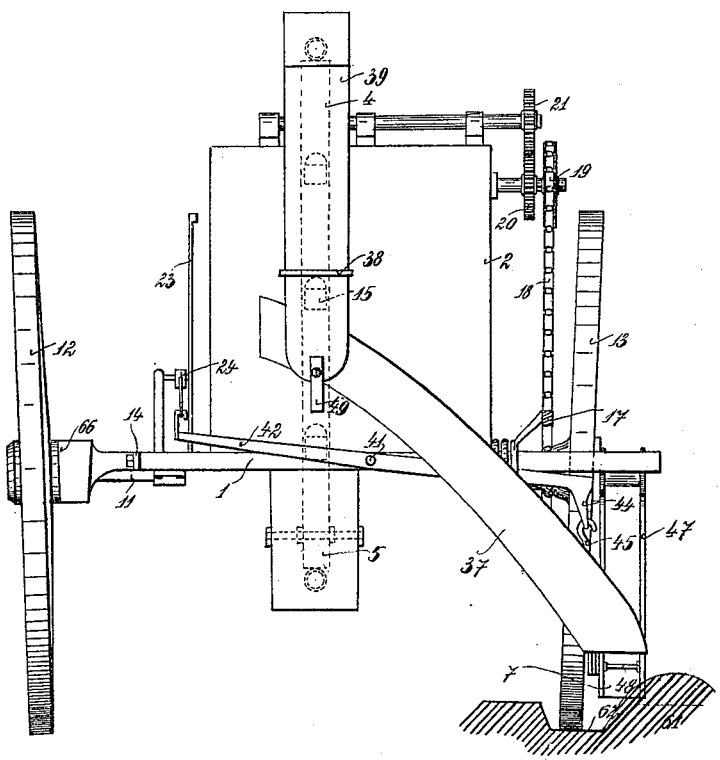
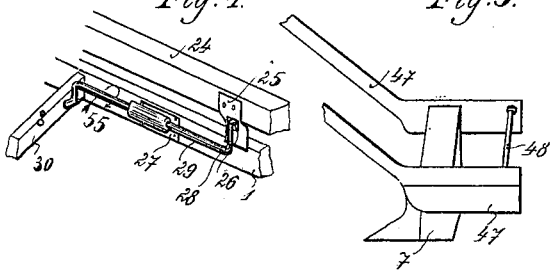 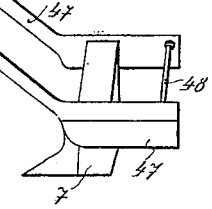 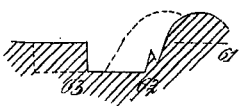 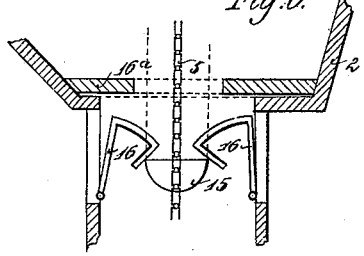
Witnesses:
Wilhelm Vogt
Henry E. Cording
Inventor:
Max Tonko,
By J. Walter Douglas
Attorney

UNITED STATES PATENT OFFICE.

MAX TONKO, OF STOCKERAU, AUSTRIA-HUNGARY.

POTATO PLANTING OR SETTING MACHINE.

SPECIFICATION forming part of Letters Patent No. 670,214, dated March 19, 1901.

Application filed October 18, 1900. Serial No. 33,530. (No model.)

*To all whom it may concern:*

Be it known that I, MAX TONKO, mechanical engineer, a subject of the Emperor of Austria-Hungary, residing at Stockerau, Lower Austria, Austria-Hungary, (whose post-office address is 28 Manhardstrasse,) have invented certain new and useful Improvements in Potato Planting or Setting Machines, of which the following is a specification.

This invention relates to potato planting or setting machines which make furrows and set the potatoes therein at any desired distance apart. All the parts of a machine that are used for working the ground can be rendered inoperative or raised when, for example, the machine is to be turned on ground which is not to be treated or when it is merely to be transferred from place to place.

A machine according to this invention is shown in the accompanying drawings, in which—

Figure 1:
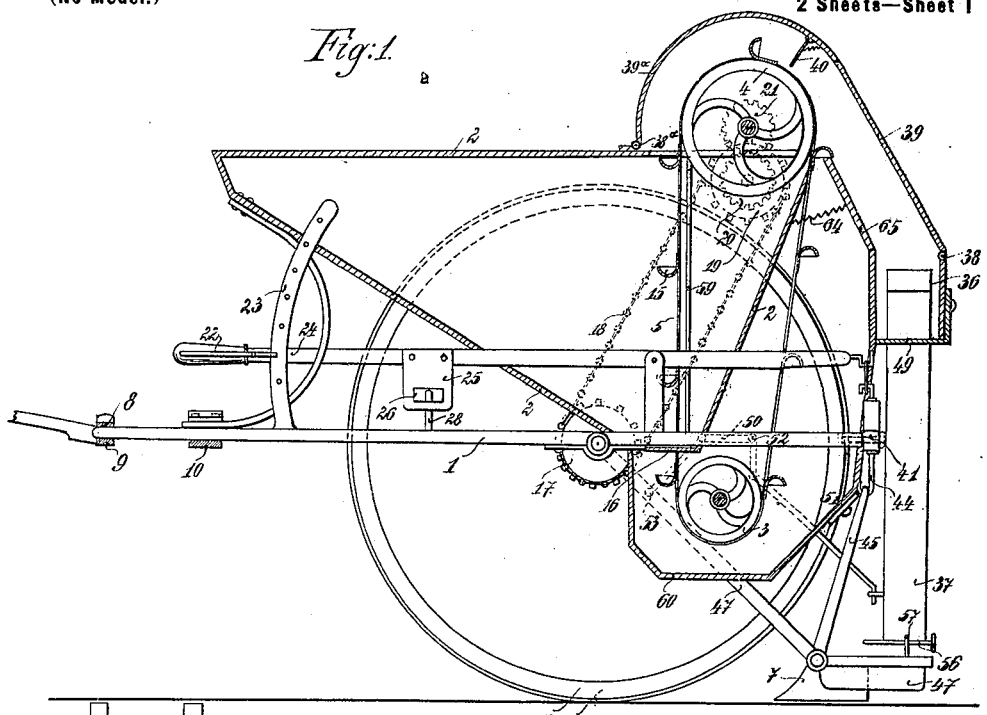
Figure 2:
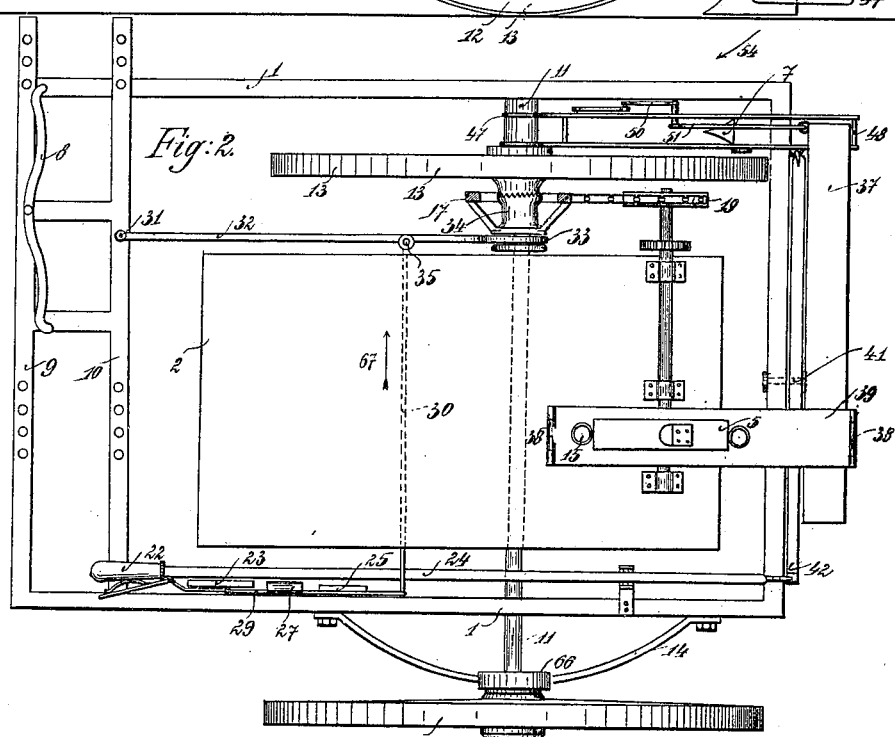

Figure 1 is a side elevation. Fig. 2 is a plan. Fig. 3 is a rear view. Figs. 4 and 5 are detail perspective views, and Fig. 6 is a detail view in sectional elevation, while Fig. 7 is a cross-section of a furrow made by the machine and illustrates its mode of operation.

A potato planting or setting machine according to this invention comprises a horizontal frame 1, mounted on wheels, a potato-box, an elevator 3, 4, 5, and 15 for removing the potatoes from the box, and an adjustable plowshare 7.

The frame 1 of the machine is provided with an adjustable swingle-tree 8, its sides being connected at the front end by two cross-beams 9 and 10. There is also mounted on the frame the axle 11 of the carrying-wheels 12 and 13. The wheel 12 on the left hand is mounted on a portion of the axle situate outside of the frame 1 and the right-hand wheel 13 on a portion thereof situate inside the frame. To carry the left-hand end of the axle 11, projecting beyond the frame 1, a curved support 14, Fig. 2, provided with an axle-box 66, is secured to the frame 1.

The elevator comprises a lower wheel 3, Fig. 1, an upper wheel 4, and a chain, band, or belt (hereinafter called a "chain") 5, which passes over the wheels 3 and 4 and carries the dished lifting-buckets 15. Although in the example illustrated by the accompanying drawings there is only one pair of bucket-wheels 3 and 4, there may, if desired, be two or more pairs of such wheels each with a corresponding chain. The lifting-buckets 15 of the several chains will then be so arranged that those on one chain will not be opposite to those of another in order to cause the buckets to lift potatoes and deliver them to the place of setting one after another. The upper and lower wheels 3 and 4 are arranged so that the rising piece of the chain 5 is inside and the downwardly-moving piece is outside the potato-box 2. In order that the buckets may be able to pass through the bottom of the potato-box when the belt is moved, an opening is provided, below which are two flaps 16, Figs. 1 and 6. These flaps each have an approximately triangular section and are adapted to open, so that the chain can pass between them, but even the smallest potato cannot fall out. As will be seen by reference to Fig. 6, the flaps 16 are opened laterally by the pressure of the rising buckets, so that their motion will be impeded as little as possible by potatoes resting on them. In order to prevent the potatoes from rubbing against the flaps, the opening in the bottom of the potato-box may be advantageously provided with a false bottom $16^a$ between the potatoes and the flaps, so as to prevent the weight of the former from bearing directly on the flaps. The flaps are closed after the passage of the buckets 15 either by spring action or by counterweights or the like. (Not shown.) The bucket and chain gear is driven by means of a separate chain-wheel 17, which is mounted on the axle 11, Fig. 1, of the carrying-wheels 12 and 13, with the latter of which it can be coupled. By means of its chain 18 the wheel 17 drives another chain-wheel 19, on the axle of which there is also keyed a toothed wheel 20. The toothed wheel 20 engages with another toothed wheel 21, keyed on the shaft of the upper wheel 4 of the bucket-chain. The engagement of the chain-wheel 17 with the carrying-wheel 13 is effected by means of an adjusting-lever 24, which is provided with an operating-handle 22 and adapted to be locked in position by a spring-controlled locking-pin which is mounted near the handle 22 and engages in one of several holes in upright guide-bars 23. To the adjusting-lever 24 there is secured a suitable bent piece of sheet metal 25, Fig. 4, provided with a slot 26. On the inner side of the left-hand beam of the frame 1, Figs. 1 and 4, there is mounted in bearings 27 a supplementary shaft 29, which is bent upwardly at one end to form a hook 28 and at the other end is bent downwardly at right angles to its main portion and connected to a bar 30, Fig. 4. The bar 30, which extends across the greater part of the frame, is connected at its farther end to a lever 32, situate at right angles to the bar. The lever 32 is pivoted at one end to a transverse bar 31 at the front end of the frame and is provided at its other or free end with a ring or collar 33, which engages in an annular groove in the hub 34 of the chain-wheel 17. The side of the hub 34 adjacent to the carrying-wheel 13 is provided with coupling-teeth which engage with corresponding teeth on the hub of the wheel 13 when the chain-wheel 17 is moved on the axle 11 in the direction of the carrying-wheel 13. This coupling movement is effected by pressing the adjusting-lever 24 downwardly, so that the hook 28, engaging in the slot 26, rotates the shaft 29 in the direction indicated by the arrow 55, Fig. 4. The transverse bar 30 consequently moves the lever 32 in the direction indicated by the arrow 67 in Fig. 2, and thereby couples the chain-wheel 17 with the carrying-wheel 13. When the adjusting-lever 24 is raised, the bent sheet-metal piece 25 causes the supplementary shaft 29 to rotate in the reverse direction, so as to uncouple the wheels 17 and 13, and thereby also to disconnect the driving mechanism of the chain-and-bucket gear.

The potatoes, which are taken singly by the buckets 15 from the box 2, fall into a delivery-passage 36, whence they pass into a trough 37. The upper portion of the chain-and-bucket gear is inclosed by rear and upper covers 39 and 39ª, which rotate on hinges 38 and 38ª in order to permit of access to the interior. In the interior of the upper cover 39ª and situate in the path of the buckets there is provided for each chain a spring-controlled plate 40, which prevents the potatoes from falling prematurely into the receiving-trough 37. The result of this is that a potato cannot fall into the delivery-passage 36 until a flap or door 65 has been closed by a spring 64 after the passage of the preceding bucket, so that this flap or door will act as a guide for the potato.

The rear end of the adjusting-lever 24 is connected to the left-hand end of a double-arm transverse lever 42, Figs. 1, 2, and 3, that is mounted on a pin 41 and carries at its right-hand end a plowshare 7, which is suspended by means of a hook 44 and a rod 45, that is adjustable in length.

When the adjusting-lever 24 is lowered, the wheels 17 and 13 engage with each other, and the left-hand end of the lever 42, adjacent to the plowshare 7, is raised, so that the right-hand end of the lever and the plowshare are lowered.

The plowshare 7 is formed by a block provided with a suitable cutting edge and secured to and between two side frames 47. The side frames are connected by a transverse bolt 48, located at some distance behind the plowshare, so as to form a rectangular opening, above which the opening of the potato-receiving trough 37 is located, so that the potatoes fall close behind the plowshare into the furrow formed thereby. The upper ends of the side frames are connected to the axle of the carrying-wheels.

The receiving-trough 37, which is curved, bears on a rod 49, secured to the delivery-passage 36, and is movably connected at its lower end to the side frames 47 to cause its delivery-opening to remain constantly above the rectangular opening at the back of the plowshare. For this purpose the receiving-trough 37 is connected near its lower end by a rod 51 to one end of a bell-crank lever 50, that is mounted to rock on a pin 52 on the frame 1 and is connected at its other end with the plowshare side frames 47 by means of a rod 53. When the plowshare is raised or lowered by means of the adjusting-lever, it is partly rotated, together with its side frames, about the main axle 11. By means of the bell-crank lever 50 and the rods 51 and 53, connected to its opposite ends, the lower end of the receiving-trough 37 is maintained in its position relative to the plowshare, and for this purpose the trough carries a guide-pin 56, on which slides a projecting eye 57, which is secured to the plowshare side frame and effects the connection of the plowshare. The bell-crank lever 50 and the rods 51 and 53, connected to the opposite ends thereof, are arranged in such a way that the horizontal movement of the plowshare, caused by its being raised or lowered, is equal to that of the lower end of the receiving-trough. By this means the end of receiving-trough is constantly held above the opening behind the plowshare in all positions of the latter.

In the interior of the potato-box a vertical strip 59 is provided for the chain of the bucket-and-chain gear for the purpose of protecting the potatoes from being crushed. The portion of the chain of the chain-and-bucket gear that is outside the potato-box may advantageously have a casing or cover 60, which, in order to allow the buckets to pass through, is provided with the aforesaid flap or door 65, acted upon by the spring 64.

When the machine is in use, the right-hand wheel 13 runs in the furrow 62, made by the plow, Fig. 3, and the plowshare 7 makes a furrow 61 in the ridge of earth thrown up, in which the potatoes are set at fixed intervals. One of the side frames 47 slides with its rear end on the ridge of earth and prevents the potatoes deposited in the furrow 61 from falling out again. The depth of the furrow 61 can be altered by lengthening or shortening the rod 45, that carries the plowshare 7. The potatoes that have been set are covered by the earth (indicated by a dotted line in Fig. 7) turned up by the plow in making the next furrow 63.

What I claim is—

1. In a potato planting or setting machine, an elevator for the potatoes, a carrying-wheel for the machine, a chain-wheel located adjacent to the carrying-wheel and adapted to be coupled thereto to operate the elevator, an axle for the carrying-wheel on which the chain-wheel is adapted to slide, a lever pivoted at one end to the frame of the machine and having its free end in engagement with the periphery of the chain-wheel, and means for shifting said lever laterally to couple or uncouple the chain-wheel with the carrying-wheel, said means comprising a lever adapted to be raised and lowered in a vertical plane, a recessed projection carried by said lever, an oscillating shaft provided at one end with a hook adapted to ride in the recess of said projection as the vertically-movable lever is raised or lowered, and a link connecting the other hooked end of the oscillating shaft with the laterally-movable lever, substantially as and for the purposes described.

2. In a potato planting or setting machine, a potato-box having an opening in its base, a false bottom protecting said opening, a chain elevator provided with buckets, the rising portion of said elevator arranged to pass through the opening and false bottom and to traverse the box, and two substantially triangular-shaped flaps each pivoted at its apex at one side of and below the opening and false bottom, said flaps adapted to swing inward with their bases parallel to the chain to close the opening and to be raised when the buckets impinge upon the inclined sides of the flaps to permit the buckets to pass between said flaps, substantially as and for the purposes described.

3. In a potato planting or setting machine, an adjustable plowshare provided with two frames secured thereto at opposite sides, a transverse lever pivoted intermediate of its ends and connected at one end to the side frames of the plowshare, and an adjusting-lever, connected with the other end of the transverse lever and adapted to be raised and lowered to elevate or depress, through the transverse lever, the plowshare, substantially as and for the purposes described.

4. In a potato planting or setting machine, an elevator for the potatoes provided with a series of buckets, a hinged cover located above the elevator and forming a chute or passage for the potatoes, a trough leading from said chute or passage to the furrow, a spring-controlled closing-flap forming the inner side of a portion of the chute or passage and adapted to be opened by the descending buckets of the elevator, and a spring-controlled flap projecting from the upper portion of the chute or passage and adapted to retain the potatoes discharged from the buckets until the flap on the inner side of the chute has been closed, substantially as and for the purposes described.

5. In a potato planting or setting machine, a plowshare, a trough having a discharge-opening arranged to the rear of the plowshare, and an adjustable connection of the trough with said plowshare comprising the guide-pin 56, an eye 57, a bell-crank lever 50, mounted on the frame of the machine, and side frames 47 connected to opposite sides of the plowshare, said bell-crank lever 50 being connected at one end to said side frames and at the other end with said trough, substantially as and for the purposes described.

In testimony whereof I have hereunto set my hand in presence of two subscribing witnesses.

MAX TONKO.

Witnesses:
FRANZ REITER,
ALVESTO S. HOGUE.